(12) United States Patent
Shima et al.

(10) Patent No.: US 8,943,882 B2
(45) Date of Patent: Feb. 3, 2015

(54) TIRE AIR PRESSURE MONITORING DEVICE

(75) Inventors: Takashi Shima, Milton Keynes (GB);
Syoji Terada, Hiratsuka (JP); Kazuo Sakaguchi, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/113,174

(22) PCT Filed: Feb. 20, 2012

(86) PCT No.: PCT/JP2012/053972
§ 371 (c)(1),
(2), (4) Date: Nov. 18, 2013

(87) PCT Pub. No.: WO2012/147395
PCT Pub. Date: Nov. 1, 2012

(65) Prior Publication Data
US 2014/0076040 A1 Mar. 20, 2014

(30) Foreign Application Priority Data

Apr. 25, 2011 (JP) ................................. 2011-096674

(51) Int. Cl.
*B60C 23/02* (2006.01)
*B60C 23/04* (2006.01)

(52) U.S. Cl.
CPC ......... *B60C 23/0415* (2013.01); *B60C 23/0416* (2013.01); *B60C 23/0488* (2013.01); *B60C 23/0489* (2013.01)
USPC ........................................ 73/146.5; 340/447

(58) Field of Classification Search
USPC ............................................... 73/146–146.8
See application file for complete search history.

(56) References Cited

U.S. PATENT DOCUMENTS

| 5,826,210 | A | 10/1998 | Izumi et al. | |
|---|---|---|---|---|
| 5,936,519 | A | 8/1999 | Nakajima et al. | |
| 2005/0012501 | A1* | 1/2005 | Isono et al. | 324/300 |
| 2013/0222128 | A1* | 8/2013 | Watabe et al. | 340/447 |
| 2014/0085068 | A1* | 3/2014 | Kosugi | 340/447 |
| 2014/0150543 | A1* | 6/2014 | Shima et al. | 73/146 |
| 2014/0167950 | A1* | 6/2014 | Shima et al. | 340/447 |
| 2014/0184402 | A1* | 7/2014 | Kosugi et al. | 340/442 |
| 2014/0354421 | A1* | 12/2014 | Kosugi et al. | 340/447 |

FOREIGN PATENT DOCUMENTS

| JP | 6-286430 A | 10/1994 |
|---|---|---|
| JP | 9-203678 A | 8/1997 |
| JP | 2010-122023 A | 6/2010 |

\* cited by examiner

*Primary Examiner* — Andre Allen
(74) *Attorney, Agent, or Firm* — Young Basile (57) ABSTRACT

A tire pressure monitoring system controller is provided that comprises a rotational position calculation unit that detects a rotational position for each wheel when a wireless signal including a specific sensor ID has been transmitted; a wheel position determination unit that acquires the rotational position of each wheel a plurality of times and accumulates rotational position data for each wheel, and determines the wheel position corresponding to the rotational position data with the least degree of dispersion among all the rotation position data as the wheel position of a transmitter corresponding to the sensor ID; and a rotational position detection inhibition unit that inhibits the detection of the rotational position of each wheel by the rotational position calculation unit when braking control that controls a wheel cylinder pressure of the wheels is being executed.

6 Claims, 5 Drawing Sheets

TIRE AIR PRESSURE MONITORING DEVICE

CROSS-REFERENCE TO RELATED APPLICATIONS

This national stage application claims priority to Japanese Patent Application No. 2011-096674 filed on Apr. 25, 2011, which is incorporated herein in its entirety.

TECHNICAL FIELD

The present invention relates in general to a tire air pressure monitoring device.

BACKGROUND

In a tire air or pneumatic pressure monitoring device such as that described in Japanese Patent Application Publication No. 2010-122023, a transmitter sends a wireless signal at a constant, prescribed rotational position. When the wireless signals are received on the side of the vehicle, the rotational positions of respective wheels are detected. The wheel position associated with a transmitter corresponding to the rotational position that is best in synchronization with the output period of the wireless signal among the rotational positions of the wheels is determined as the position of the wheel (wheel position) with which that transmitter is associated.

According to the device described above, the rotational position of a transmitter is determined from the output value of an acceleration sensor, and a wireless signal is output at the time when the output value of the acceleration sensor assumes the prescribed value. At this instance, when a braking control such as an ABS control is performed, since the wheel under control is subject to longitudinally vibrate with an extremely short period to disturb the detected value of the acceleration sensor, the transmitter is likely to determine the rotational position erroneously and output a wireless signal at a rotational position different from the prescribed rotational position. Consequently, because of the determination of the wheel position of the transmitter based on the erroneous data on the rotational position, the determination of the wheel position is likely to be delayed.

BRIEF SUMMARY

Provided herein is a tire air or pneumatic pressure monitoring device that may suppress delay in the determination of the wheel position.

In order to achieve the objective described above, according to the present invention, when braking control to control a wheel cylinder pressure of wheels is being executed, the detection of each wheel will be inhibited.

Consequently, according to the present invention, when the possibility is present in which a wireless signal has been transmitted from a transmitter at a rotational position different from the prescribed rotational position, the rotational position associated with each wheel corresponding to that wireless signal will not be detected. Therefore, the erroneous data of the rotational position for determination of the wheel position is prevented from being used so that a delay in the wheel position determination may be suppressed.

BRIEF DESCRIPTION OF THE DRAWINGS

Referring now to the attached drawings which form a part of this original disclosure.

DETAILED DESCRIPTION OF THE EMBODIMENTS

In the following, the embodiments of the present invention will be described with reference to embodiments based on the drawings.

Figure 1:
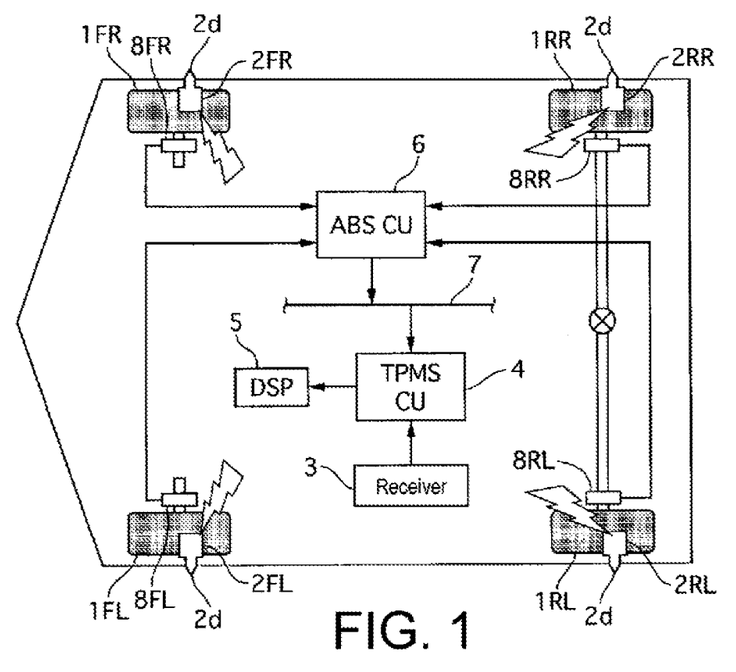
FIG. 1 is a configuration diagram illustrating the configuration of the tire pneumatic pressure monitoring device in a first embodiment.

FIG. 1 is a configuration diagram illustrating a tire air or pneumatic pressure monitoring device in a first embodiment. In this figure, the end letters annexed to each reference sign is intended to indicate as follows: FL stands for the left front wheel, FR stands for the right front wheel, RL stands for the left rear wheel, and RR stands for the right rear wheel, respectively. In the following description, when not specifically necessary, the description of FL, FR, RL and RR will be omitted.

The tire pneumatic pressure monitoring device in the first embodiment is provided with TPMS (tire pressure monitoring system) sensors 2, a receiver 3, a TPMS control unit (TPMSCU) 4, a display 5, and wheel speed sensors 8. The TPMS sensors 2 are installed with one sensor 2 on each of the wheels 1. The receiver 3, the TPMSCU 4, the display 5 and the wheel speed sensors 8 are arranged on the side of the vehicle body.

Figure 2:
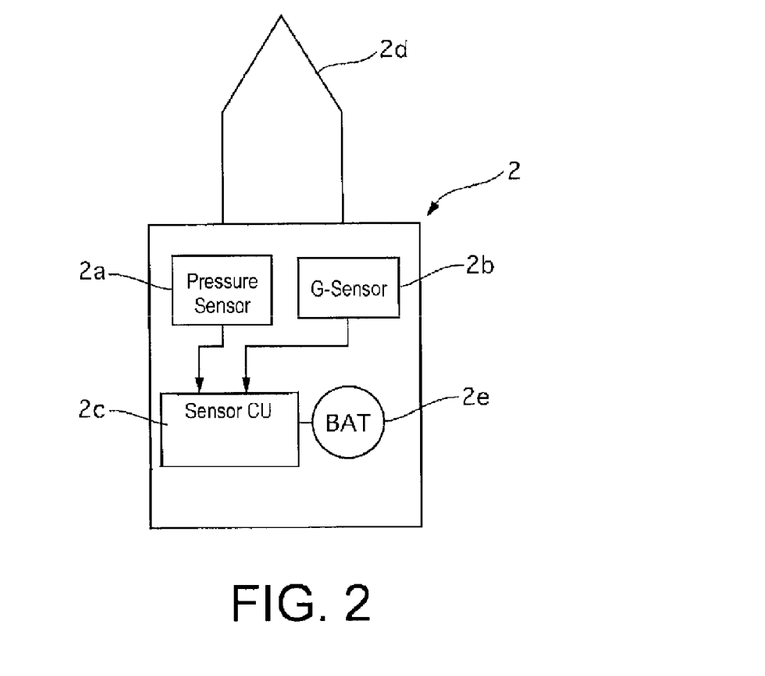
FIG. 2 is a configuration diagram of a tire pressure monitoring system (TPMS) sensor 2.

Each TPMS sensor 2 is installed at the position of an air valve (not shown in the figure) of each tire. FIG. 2 is a diagram illustrating the configuration of the TPMS sensor 2. The TPMS sensor 2 comprises a pressure sensor (a tire pneumatic pressure detecting mechanism) 2a, an acceleration sensor (G sensor) 2b, a sensor control unit (sensor CU) 2c, a transmitter 2d, and a button battery 2e.

Here, the pressure sensor 2a detects the pneumatic pressure [kPa] of the tire. The G sensor 2b detects the acceleration in the centrifugal direction [G] acting on the tire. The sensor CU 2c operates under the power supplied from the button battery 2e, and the TPMS data containing the pneumatic pressure information of the tire detected by the pressure sensor 2a and the sensor ID (the identification information) is sent as a wireless signal from the transmitter 2d. In the first embodiment, the sensor IDs are defined as 1 to 4.

The sensor CU 2c compares the acceleration in the centrifugal direction detected by the G sensor 2b with a preset threshold for determination of a vehicle running state. When the acceleration in the centrifugal direction is less than the running determination threshold, a determination is made that the vehicle is being stopped or stationary, so that transmission of the TPMS data is stopped. On the other hand, when the acceleration in the centrifugal direction exceeds the running determination threshold, a determination is made that the vehicle is running, and the TPMS data will be transmitted at a prescribed timing.

The receiver 3 receives the wireless signals output from each TPMS sensor 2 to decode and output to the TPMSCU 4.

The TPMSCU 4 reads respective TPMS data, based on the sensor ID in the TPMS data and with reference to the correspondence relationship between each of the sensor IDs and the wheel positions stored in a nonvolatile memory 4d (see FIG. 3), the TPMSCU 4 determines to which wheel position the TPMS data is corresponding and indicates on the display 5 a tire air pressure contained in the TPMS data as the pneumatic pressure of the corresponding wheel position. When the pneumatic pressure of a tire becomes below a lower limit threshold, the decrease in the pneumatic pressure is notified by a change in the display color, in flashing on the display, by an alarm sound, or the like.

Based on the wheel speed chain of pulses from each of wheel speed sensors 8, the ABSCU 6 detects the wheel speed of each wheel 1, respectively. When a certain wheel has a locking tendency, an ABS actuator not shown in the figure is operated to adjust or maintain a wheel cylinder pressure of the corresponding wheel to suppress the locking tendency. In this way, the anti-skid brake control (ABS) is carried out. The ABSCU 6 outputs the count value of the wheel speed pulses to the CAN communication line 7 at every prescribed period of time (e.g., 20 msec.).

Each wheel speed sensor 8 is formed in a pulse generator that generates a wheel speed chain of pulses producing a prescribed number z (e.g., z=48) for each cycle of the rotation of the wheel 1. The wheel speed sensor comprises a gear-shaped rotor rotating in synchronization with the wheel 1, and both a permanent magnet and a coil arranged on the side of the vehicle body and facing the outer periphery of the rotor. As the rotor rotates, the concave-convex or corrugated surface of the rotor crosses the magnetic field formed on the periphery of the wheel speed sensor 8, so that the magnetic flux density varies to generate an electromotive force in the coil, and such a variation in the voltage is output as the wheel speed pulse signal to the ABSCU 6.

In addition to the ABS control, the ABSCU 6 executes a vehicle behavior stabilization control, a brake traction control, and a brake LSD control as a control to control the wheel cylinder pressure of the wheel 1. More specifically, by the vehicle behavior stabilization control, the wheel is imparted with a braking force to suppress an over-steering tendency or under-steering tendency of the vehicle to secure a vehicle running stability. By the brake traction control, a road gripping force of the tire will be increased by suppressing idle rotation or spin of a drive wheel, when one side of the drive wheels slips such as on a low μroad and the like. In the brake LSC control, a differential is limited by using a brake. ABSCU 6 outputs a control flag signal to the CAN communication line 7 and indicates whether or not the brake control described above is in execution. The control flag is set to "0" when the brake control is not in place or executed while set to "1" when executed.

As described above, based on the correspondence relationship between the sensor ID and the wheel position stored in the memory 4d, the TPMSCU 4 determines to which wheel the received TPMS belong. Consequently, when a tire rotation is carried out while the vehicle stops, the correspondence relationship between the sensor ID and the wheel position stored in the memory 4d is not in agreement with the actual correspondence relationship, and it is impossible to find out to which wheel the TPMS data belong. Here, the "tire rotation" refers to the operation of swapping the installing wheel positions of the tires so as to ensure an even tread wear of the tires and, thus, to prolong the service lifetime (the tread lifetime). For example, for a passenger vehicle, usually the front/rear wheel tires are swapped with the position of the left/right wheel tires reversed.

Here, according to the first embodiment, in order to update and store the correspondence relationship between each sensor ID and each wheel position after a tire rotation in the memory 4d, when there is a possibility that a tire rotation has been carried out, the transmission period of TPMS data on the side of each TPMS sensor 2 will be changed, on the side of TPMSCU 4, based on the transmission period of the TPMS data and each wheel speed pulse, a determination is made with which wheel each TPMS sensor 2 is associated.

When the vehicle stop determination time immediately before the start of running of the vehicle is equal to or greater than a prescribed time (e.g. 15 min), the sensor CU2c of the TPMS sensor 2 determines that the tire rotation may have been carried out.

When the vehicle stop determination time immediately before the start of running of the vehicle is less than the prescribed time, the sensor CU 2c executes a "normal mode" in which the TPMS data are transmitted every constant or prescribed interval (e.g. in one minute interval). On the other hand, when the vehicle stop determination time is equal to or greater than the prescribed time, the sensor CU executes a "constant position transmission mode" in which, in an interval shorter than the transmission interval in the normal mode (e.g., in an interval of about 16 seconds), the TPMS data are transmitted at a constant or prescribed rotational position.

The constant position transmission mode is executed until the number of transmission of the TPMS data reaches a prescribed number of times (e.g., 40 rounds). When the number of times of the transmission reaches the prescribed number of times, the constant position transmission mode transfers to the normal mode. When a determination has been made that the vehicle stops before the number of transmission times of the TPMS data reaches the prescribed number of times, if the vehicle stop determination time is shorter than the prescribed time (15 min.), the constant position transmission mode before the vehicle stop is continued until the number of times of transmission reaches the prescribed number of times. When the vehicle stop determination time is longer than the prescribed time, the continuation of the constant position transmission mode before the vehicle stop is cancelled, and a new constant position transmission mode is started.

In the constant position transmission mode, based on the gravity acceleration dependent component of the acceleration in the centrifugal direction detected by the G sensor 2b, the sensor CU2c determines a transmission timing of the TPMS data in the constant position transmission mode. The acceleration in the centrifugal direction acting on the TPMS sensor 2 varies in accordance with the acceleration/deceleration of the wheels 1, yet the gravity acceleration dependent component is always constant. That is, the acceleration in the centrifugal direction acting on the TPMS sensor shows a waveform with +1 [G] at a top point, −1 [G] at a bottom point of, and 0 [G] in the middle position of 90° between the top point and bottom point. In other words, by monitoring the magnitude and direction of the gravity acceleration component of the acceleration in the centrifugal direction, it is possible to grasp or identify the rotational position of the TPMS sensor 2. As a result, for example, by outputting the TPMS data at a peak of the gravity acceleration dependent component, the TPMS data may be output constantly at the top point.

When the time that has elapsed for a predetermined time (e.g., 15 min.) or more from OFF to ON position of the ignition switch, the TPMSCU 4 determines that the tire rotation may have been carried out.

When the time that has elapsed from OFF to ON of the ignition switch is shorter than the predetermined time, based on the pneumatic pressure information in the TPMS transmitted from each TPMS sensor 2, the TPMSCU 4 executes a "monitor mode" in which the pneumatic pressure of the tire of each wheel 1 is monitored. On the other hand, when the elapsed time from OFF to ON of the ignition switch is longer than the predetermined time, the TPMSCU 4 executes an "auto-learning mode" which will be carried out until the wheel positions of all TPMS sensors 2 are determined, or until a predetermined, cumulative travel time (e.g. 8 minutes) from the start of this mode has elapsed. When the wheel positions of all TPMS sensors are determined, or, the predetermined cumulative time has passed, control transfers to the monitor mode.

Even in the auto-learning mode, it is still possible to monitor the pneumatic pressure of the tires from the pneumatic pressure information contained in the TPMS data. Consequently, the display of the pneumatic pressure and the warning of a decreased pneumatic pressure are carried out based on the correspondence relationship between the sensor ID and the wheel position currently stored in the memory 4d during the automatic running mode.

In the auto-learning mode, the TPMSCU 4 receives a count value of the wheel speed pulses from the ABS control unit (ABSCU) 6 via the CAN communication line 7 and executes the wheel position determination control described below.

Figure 3:
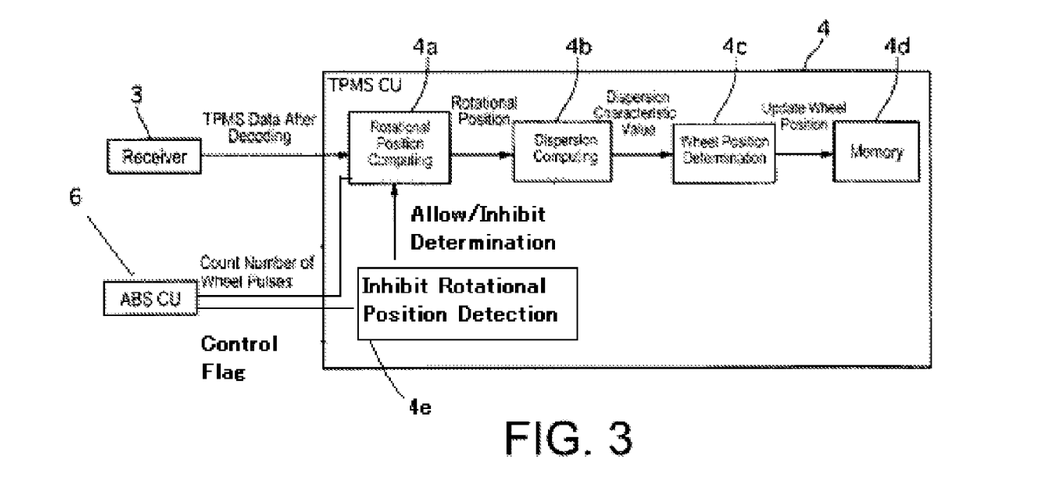
FIG. 3 is a control block diagram illustrating a control block diagram of a TPMSCU 4 for executing the wheel position determination control.

FIG. 3 is a control block diagram of the TPMSCU 4 for executing the wheel position determination control. The TPMSCU 4 has a rotational position calculation unit (the rotational position detecting mechanism) 4a, a dispersion calculation section 4b, a wheel position determination section (the wheel position determination mechanism) 4c, a memory 4d, a rotational position detection inhibition unit (detection inhibition mechanism) 4e.

The rotational position calculation unit 4a receives the TPMS data after being decoded to be output from the receiver 3 and the count values of the wheel speed pulses output from the ABSCU 6 to the CAN communication line 7 to calculate a rotational position (number of teeth of rotor) for each rotor when the rotational position of each TPMS sensor assumes the top point. Note that the "number of teeth" indicate which tooth the wheel speed sensor 8 is counting and may be acquired by dividing the count value of the wheel speed pulses by a count value per rotation of the tire (i.e., the number of teeth per rotation z=48). In the first embodiment, when the count value of the wheel speed pulses of the first time from the start of the auto-learning mode is input, the value obtained by adding 1 to the remainder of the division operation of the count value by the number of teeth of 1 cycle or rotation is taken as the reference number of teeth. In the second and subsequent times, based on the number of count of the wheel speed pulses with respect to the reference number of teeth (i.e. current count value−the count value at the first time), the number or teeth may be determined.

Figure 4:
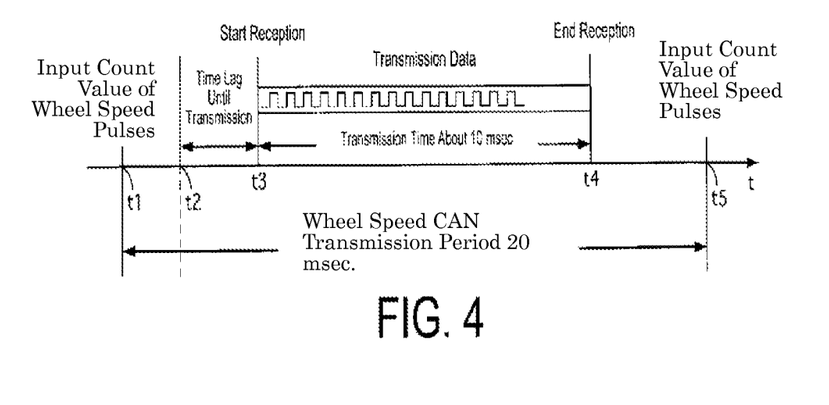
FIG. 4 is a diagram illustrating a method for calculation for a rotational position of each wheel 1.

FIG. 4 is a diagram showing a method for calculating the rotational position of each wheel 1. In FIG. 4, t1 represents the time when the count value of the wheel speed pulses is input; t2 represents the time when the rotational position of the TPMS sensor 2 reaches the top point; t3 represents the time when the TPMS sensor 2 actually starts the transmission of the TPMS data; t4 represents the time when the reception of the TPMS data by the TPMSCU 4 is completed; and t5 represents the time when the count value of the wheel speed pulses is input. In this case, t1, t4, and t5 can be actually measured; t3 can be calculated by subtracting the data length (nominal value, e.g., about 10 msec.) of the TPMS data from t4; and t2 can be calculated by subtracting a time lag in the transmission (t2 can be determined beforehand by experiment or the like) from t3.

Consequently, supposing the number of teeth at t1 is zt1, the number of teeth at t2 is zt2, and the number of teeth at t5 is zt5, respectively, the equation that follows is established:

$$(t2-t1)/(t5-t1)=(zt2-zt1)/(zt5-zt1)$$

Because $zt2=zt1+(zt5-zt1)*(t2-0)/(t5-0)$, the number of teeth zt2 is expressed in the following manner when the rotational position of the TPMS sensor 2 is at the top point:

$$zt2=zt1+(z\,t5-zt1)*(t2-0)/(t5-0)$$

The dispersion computing section 4b accumulates a rotational position of each wheel 1 which is calculated in the rotational position calculation unit 4a for each sensor ID to acquire rotational position data, and calculates a degree of dispersion in each rotational position data for each sensor ID as a dispersion characteristic value. The calculation of the dispersion characteristic value is made each time the rotational position for the identical sensor ID is calculated by the rotational position calculation unit 4a.

Figure 5:
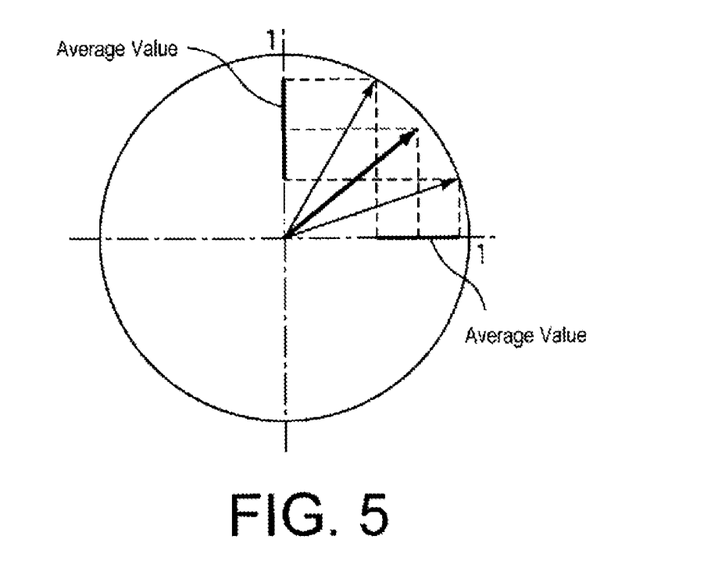
FIG. 5 is a diagram illustrating a method for calculation of a dispersion characteristic value.

FIG. 5 is a diagram illustrating a method for calculating the dispersion characteristic value. According to the first embodiment, a unit circle (a circle with radius of 1) with the origin (0, 0) on the two-dimensional plane is assumed, and the rotational position 0 [deg] (=360× the number of teeth of the rotor/48) of each wheel 1 is converted to the circumferential coordinates (cos θ, sin θ) on the unit circle. More specifically, the rotational position of each wheel 1 is calculated as follows: regarding a vector having the origin (0, 0) as the starting point and the coordinates (cos θ, sin θ) as the end with a length of 1, the average vectors (ave_cos θ, ave_sin θ) of each vector of the same rotational position data are obtained, and the scalar quantity of the average vector is calculated as the dispersion characteristic value X of the rotational position data:

$$(\cos\theta, \sin\theta)=(\cos((zt2+1)*2\pi/48), \sin((zt2+1)*2\pi/48))$$

Consequently, suppose the number of times of reception of the TPMS data with respect to the identical sensor ID as n (n is a positive integer), the average vectors (ave_cos θ, ave_sin θ) are expressed as follows:

$$(\text{ave\_cos}\,\theta, \text{ave\_sin}\,\theta)=((\Sigma(\cos\theta))/n, (\Sigma(\sin\theta))/n)$$

The dispersion characteristic value X can thus be represented as follows:

$$X = \text{ave\_cos}\,\theta 2 + \text{ave\_sin}\,\theta 2$$

The wheel position determination unit 4c works as follows. The dispersion characteristic values X of each rotational position data of the same and identical sensor ID calculated by the dispersion calculation unit 4b are compared. When the greatest value of the dispersion characteristic values X is greater than a first threshold (e.g., 0.57) and the remaining 3 dispersion characteristic values X are all less than a second threshold (e.g., 0.37), a determination is made that the wheel position of the rotational position data corresponding to the dispersion characteristics value X with the greatest value, that is, the wheel position of the wheel speed sensor 8 that has detected the corresponding rotational position data, is the wheel position of the TPMS sensor 2 corresponding to the sensor ID of the rotational position data. This determination is carried out for all of the sensor IDs; the correspondence relationship between each sensor ID and each wheel position is obtained to be registered in the memory 4d in the updating process.

The rotational position detection inhibition unit 4e inhibits or prevents the rotational position calculation unit 4a from calculating the rotational position of each wheel 1 when any wheel 1 is under a brake control in which a wheel cylinder pressure is controlled (for an anti-block brake control, a vehicle behavior stability control, a brake traction control, and a brake LSD control) by the ABSCU 6. The determination as to whether the brake control is in place or progress may be made based on a value of the control flag which is input via the CAN communication line 7.

Figure 6:
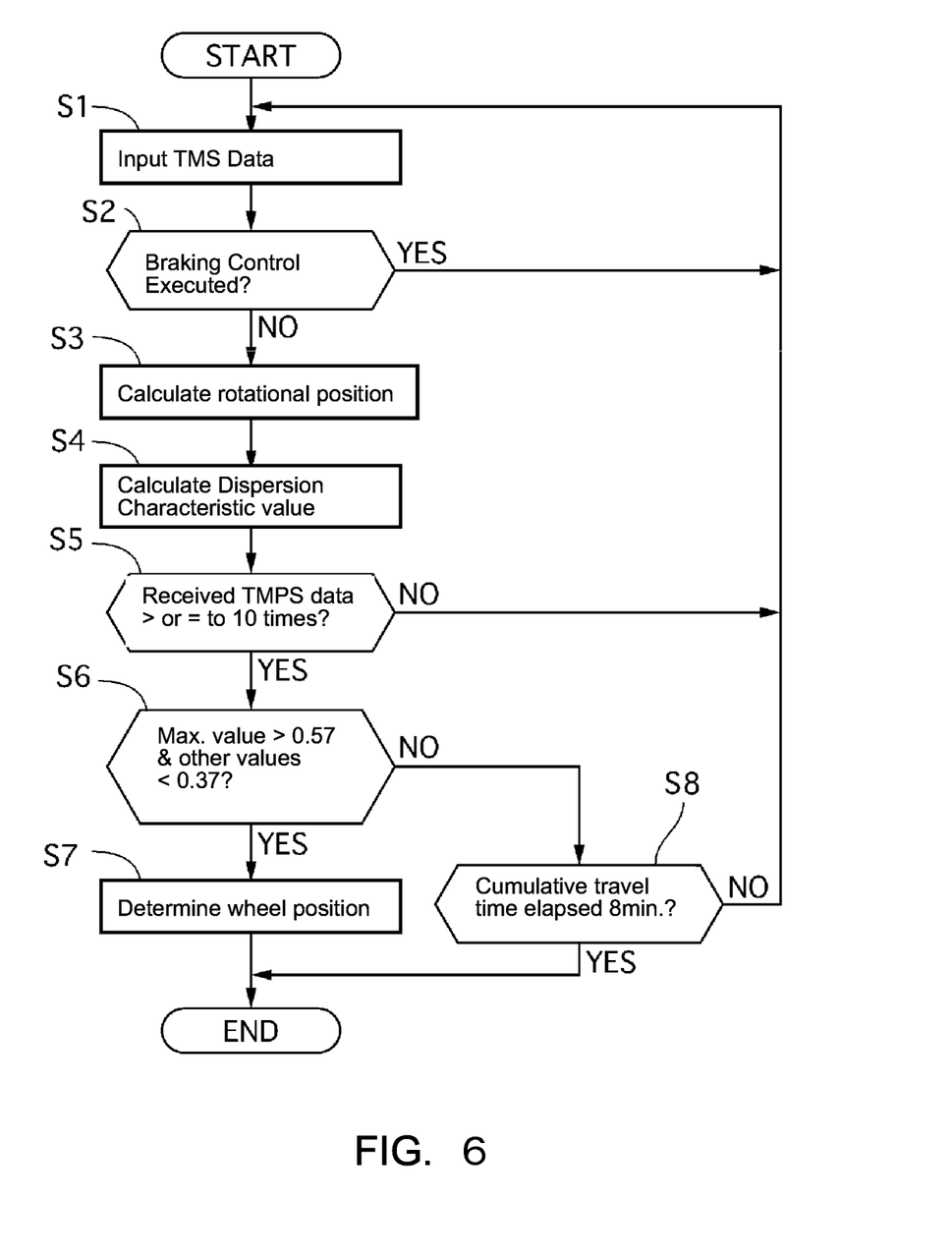
FIG. 6 is a flow chart illustrating a flow of the wheel position determination control process in the first embodiment.
Figure 7A:
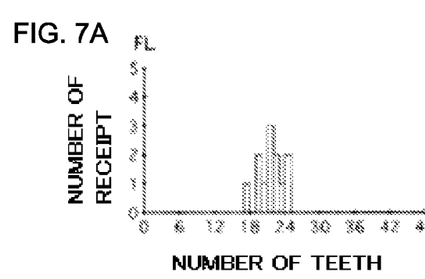
FIG. 7A is a diagram illustrating a relationship between the rotational positions (the number of teeth of the rotor) of the wheels 1FL when the rotational position of the TPMS sensor 2FL of the left front wheel 1FL assumes the highest point and the number of receipt of the TPMS data.
Figure 7B:
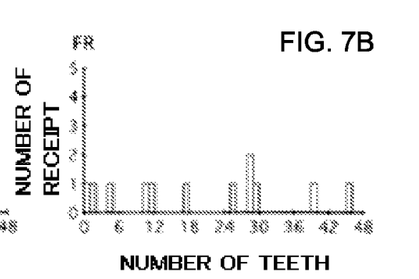
FIG. 7B is a diagram illustrating a relationship between the rotational positions (the number of teeth of the rotor) of the wheels 1FR when the rotational position of the TPMS sensor 2FL of the left front wheel 1FL assumes the highest point and the number of receipt of the TPMS data.
Figure 7C:
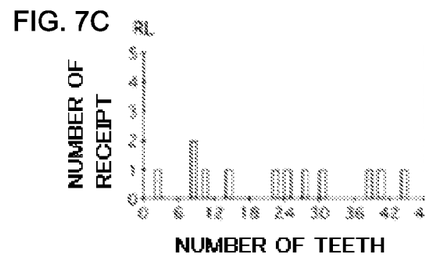
FIG. 7C is a diagram illustrating a relationship between the rotational positions (the number of teeth of the rotor) of the wheels 1RL when the rotational position of the TPMS sensor 2FL of the left front wheel 1FL assumes the highest point and the number of receipt of the TPMS data.
Figure 7D:
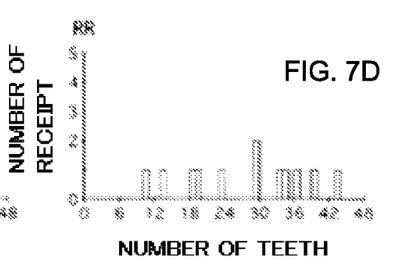
FIG. 7D is a diagram illustrating a relationship between the rotational positions (the number of teeth of the rotor) of the wheels 1RR when the rotational position of the TPMS sensor 2FL of the left front wheel 1FL assumes the highest point and the number of receipt of the TPMS data.

FIG. 6 is a flow chart illustrating the flow of the wheel position determination control process according to the first embodiment. In the following, respective steps of operation will be described. In the following description, the case of the sensor ID being "1" is assumed. However, for the other IDs (ID=2, 3, 4), the wheel position determination control process is also carried out in parallel.

In step S1, the rotational position calculation unit 4a receives the TPMS data with the sensor ID being 1. In step S2, the rotational position detection inhibition unit 4e determines whether or not a brake control is in progress, and, if YES, control returns to step S1, if NO, the control proceeds to step S3.

In step S3, the rotational position calculation section 4a calculates the rotational position of each wheel 1. In step S4, the dispersion calculation unit 4b calculates the dispersion characteristic values X of the rotational position data of each wheel 1.

In step S5, a determination is made as to whether the TPMS data with sensor ID being equal to 1 are received for a prescribed number of times (e.g., 10 times) or more. If the determination result is YES, the operation goes to step S6. If the determination is NO, the operation returns to step S1.

In step S6, the wheel position determination section 4c determines whether the greatest value of the dispersion characteristics value is over the first threshold of 0.57, and whether the value of the remaining dispersion characteristic values are less than the second threshold of 0.37. If the determination is YES, the operation goes to step S7; if the determination result is NO, the operation goes to step S8.

In step S7, the wheel position determination section 4c determines the wheel position of the rotational position data corresponding to the highest dispersion characteristic value as the wheel position of the sensor ID. Then, the auto-learning mode ends.

In step S8, the wheel position determination section 4c determines whether a predetermined cumulative or accumulated running time (e.g., 8 min.) has elapsed from the start of the auto-learning mode. If the determination result is YES, the auto-learning mode is terminated. If the determination result is NO, the operation returns to step S1.

When the wheel position determination section 4c can determine the wheel positions for all of the sensor IDs within the prescribed accumulated travel time, the correspondence relationship between the sensor ID and the wheel position is updated and stored in the memory 4d for registration. On the other hand, when it has been impossible to determine the wheel position for all of the sensor IDs within the prescribed accumulated travel time, the correspondence relationship between the sensor IDs and each wheel position currently stored in the memory 4d is continued to be used.

The TPMS sensor 2 works as follows: when the vehicle stop determination time right before the start of vehicle running is 15 min or longer, a determination is made that there is a possibility that the tire rotation has been carried out, and the operation goes from the normal mode to the constant position transmission mode. In the constant position transmission mode, after 16 seconds has elapsed from the transmission time of the previous time and the rotational position of own TPMS sensor reaches the top point, each TPMS sensor 2 transmits the TPMS data.

On the other hand, when the elapsed time between OFF and ON of the ignition switch is 15 min. or longer, the TPMSCU 4 goes from the monitoring mode to the auto-learning mode. In the auto-learning mode, each time the TPMS data are received from each TPMS sensor 2, the TPMSCU 4 calculates the rotational position (the number of teeth of the rotor) of each wheel 1 when the rotational position of the TPMS sensor 2 reaches the top point based on the input time of the count value of the wheel speed pulses, the time of completion of receipt of the TPMS data, and the like. This is carried out repeatedly for 10 or more times and accumulated as the rotational position data. Among the rotational position data, the wheel position to which the rotational position data with least degree of dispersion is determined as the wheel position of that TPMS sensor 2.

When the vehicle travels or runs, the rotation speed of each wheel 1 may different from each other due to the difference in tracks between the outer and inner wheels, the lock and the slip of the wheels 1, and the difference in the pneumatic pressure of the tires. Even when the vehicle runs straight, as the driver still may make minute corrections on the steering wheel and there is a certain difference in the road surface between he left and right sides, the difference in the rotation speed still develops between the front and rear wheels 1FL and 1FR, and between the left and right wheels 1RL and 1RR. That is, while there is a difference in rotation speed of each wheel in accordance with the running state of the vehicle, since the TPMS sensor 2 and the wheel speed sensor 8 (the teeth of the rotor thereof) rotate integrally, for the output period of a specific TPMS sensor 2, the output period of the wheel speed sensor 8 associated with the same wheel is kept being synchronized (in agreement) irrespective of the travel distance and the running state.

Consequently, by observing the degree of dispersion in the rotational position data of each wheel 1 with respect to a transmission period of the TPMS data, it is possible to make a highly precise determination on the wheel positions of each TPMS sensor 2.

FIG. 7 illustrates the relationship between the rotational positions (the number of teeth of the rotors) of the wheels 1FL, 1FR, 1RL, and 1RR when the rotational position of the TPMS sensor 2FL of the left front wheel 1FL reaches the top point and the number of times of reception of the TPMS data. Here, (a) corresponds to the wheel speed sensor 8FL of the left front wheel 1FL, (b) corresponds to the wheel speed sensor 8FR of the right front wheel 1FR, (c) corresponds to the wheel speed sensor 8RL of the left rear wheel 1RL, and (d) corresponds to the wheel speed sensor 8RR of the right rear wheel 1RR.

As will be evident from FIG. 7, whereas the dispersion degrees are high with respect to the wheel positions (the number of teeth) obtained from the wheel speed sensors 8FR, 8RL, and 8RR with respect to the other wheels (the right front wheel 1FR, the left rear wheel 1RL, and the right rear wheel 1RR), the dispersion degree of the wheel position obtained from the wheel speed sensor 8FL with respect to the own wheel (the left front wheel 1FL) is the smallest or least, so that the output period of the TPMS sensor 2FL and the output period of the wheel speed sensor 8FL are nearly synchronized with each other.

As one of the conventional tire pneumatic pressure monitoring apparatuses, an inclination sensor is arranged for each TPMS sensor, and the relationship between the wheel position of the TPMS sensor and the inclination angle is used to determine the wheel position of the TPMS sensor. For this type of tire pneumatic pressure monitoring apparatus, corresponding to running the vehicle, the difference in the rotation velocity takes place between the 4 wheels, so that the correspondence between the wheel position of the TPMS sensor and the inclination angle varies. As a result, it is impossible to make a highly precise determination on the wheel position of each TPMS sensor.

As another conventional tire pneumatic pressure monitoring apparatus, the same number of receivers as those of the TPMS sensors are arranged neighboring the sensors, respectively; based on the electromagnetic wave intensity of the received wireless signals, the wheel position of each TPMS sensor is determined. Here, it is necessary to take the sensor output, the receiver sensitivity dispersion, and the harness antenna effect into consideration for the layout of the receivers, and the reception environment and layout determine the performance. In addition, 4 receivers should be arranged. Consequently, the cost is higher.

On the other hand, for the tire pneumatic pressure monitoring device in the first embodiment, the wheel position of each TPMS sensor 2 may be specified without using the electromagnetic wave intensity, so that it is possible to determine the wheel position of each TPMS sensor 2 independent of the reception environment and the layout. In addition, one receiver 3 is sufficient, which would lead to elimination of the cost for additional sensors.

In addition, according to the first embodiment, the TPMSCU 4 calculates and determines that the rotational position of each wheel 1 is positioned at the top point based on the gravity acceleration dependent component of acceleration in the centrifugal direction that is detectable from the G sensor 2b. Since the G sensor 2b is used in the existing tire pneumatic pressure monitoring device for detection of vehicle stop and travel, the existing TPMS sensor may be commonly used so that there is no need to add new sensors on the side of the vehicle. The cost can thus be reduced.

Because the rotational position of the wheel 1 is indicated by the angle data with periodicity, the dispersion degree of the rotational position cannot be determined using the general dispersion formula defined by the average of the "square of the difference from the average or mean."

Thus, in the first embodiment, the dispersion calculation unit 4b works as follows. The rotational position 0 of each wheel 1 obtained from each wheel speed sensor 8 is converted to the circumferential coordinates $(\cos\theta, \sin\theta)$ of a unit circle having the origin $(0, 0)$ at the center. The coordinates $(\cos\theta, \sin\theta)$ are taken as vectors, the average vectors $(ave\_cos\,\theta, ave\_sin\,\theta)$ of the vectors of the same rotational position data are acquired, and the scalar quantity of the average vector is calculated as the dispersion characteristic value X. As a result, it is possible to avoid the periodicity in determining the dispersion degree of the rotational position.

Figure 8:
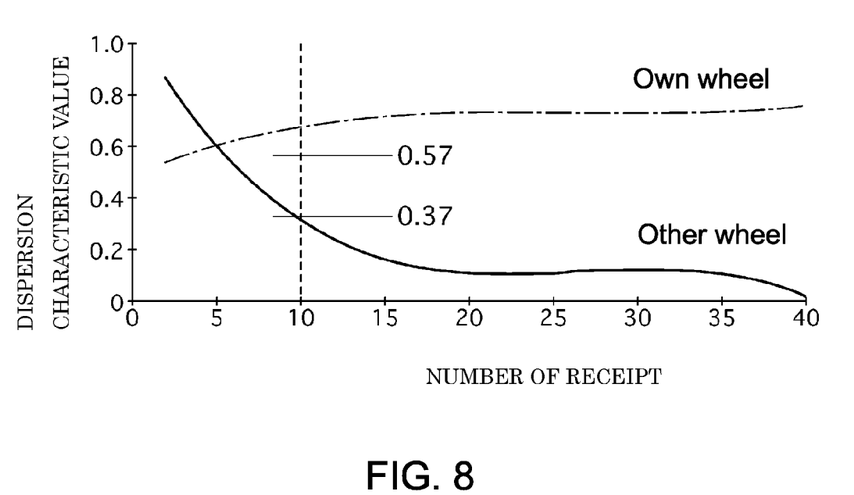
FIG. 8 is a diagram illustrating a change of the dispersion characteristic value X depending on the number of times of reception of the TPMS data.

FIG. 8 shows a diagram illustrating a change in the dispersion characteristic value X in accordance with the number of receipt of the TPMS data. In FIG. 8, the own wheel shows the dispersion characteristic value X calculated on the rotational position data of the wheel speed sensor 8 on the same wheel to which the TPMS sensor is installed, whereas the other wheels show the dispersion characteristic value X calculated on the rotational position data of the wheel speed sensor 8 on the wheel different from those to which the TPMS sensors are installed.

As shown in FIG. 8, as the number of TPMS data receipt on same sensor ID increases, such a trend is indicated in which the dispersion characteristic X approaches "1" while the dispersion characteristic value X for other wheel approaches "0". Thus, it may be ideal to select the maximum value (i.e. the dispersion characteristic value nearest to "1") at the attainment of sufficient number of receipt (about several ten times). However, since it is impossible to inform the driver of accurate tire state information during the wheel position determination period immediately after a tire rotation, the delay in the determination time would not be preferable. On the other hand, at the insufficient number of receipt (such as several times), no difference in the dispersion characteristic value with respect to the own and other wheels is detectable and the decrease in the detection accuracy will be anticipated.

Thus, in the first embodiment, the wheel position determination unit 4c compares the dispersion characteristic values on each rotational position data with respect to a specific sensor ID at receipt of the TPMS data with respect to that specific sensor ten times or more, and detects that the maximum value of the dispersion characteristic values X exceeds a first threshold value 0.57 while the remaining three dispersion characteristic values fall below a second threshold value 0.37, then the wheel position of the rotational position data corresponding to the maximum dispersion characteristic value X will be identified as the wheel position of that sensor ID.

Not only through selection of the maximum value of the dispersion characteristic values, by comparing the maximum value with the first threshold value (0.57), a certain degree of determination accuracy may be ensured. In addition, by comparing the dispersion characteristic values other than the maximum value with the second threshold value (0.37), a predetermined difference (of 0.2 or more) can be confirmed, which further enhances the determination accuracy. Therefore, at a relatively small number of receipts, such as ten times, both the determination accuracy and shortening of determination time may be achieved.

Each TPMS sensor 2 transmits TPMS data after 16 seconds has elapsed from the previous transmission time of TPMS data and at the timing at which the own rotational position reaches the top point. In the first embodiment, since the dispersion characteristic values X of each rotational position data are compared to each other for determination of the wheel position, with respect to the TPMS sensor 2 which has transmitted TPMS data, a certain amount of cumulative travel distance will be necessary in order to cause a difference in the dispersion characteristic values X between own wheel (same wheel) and other wheel (other vehicle wheel).

Assuming that TPMS data would be transmitted each time the rotational position of the TPMS data reaches a top point, no substantial difference in dispersion characteristic value will be expected between the own and other wheel so that it may be difficult to perform a wheel position determination.

Thus, by setting a transmission interval at 16 seconds+α, a certain amount of cumulative travel distance will be obtained until the TPMS data will be received ten times or more. Therefore, a sufficient difference in the dispersion characteristic value X between the own and other wheel may be created to ensure an accurate determination of the wheel position.

Upon transmitting TPMS data forty (40) times during the constant position transmission mode, the TPMS sensor 2 transfers to the normal mode. The TPMS sensor 2 consumes the power of the button battery 2e at the transmission of the TPMS data so that the battery life time of the button battery 2e will be shorter as the constant position transmission mode continues. Thus, when each wheel position may not be determined despite the elapse of sufficient cumulative travel time, the constant position transmission mode will be terminated to transfer to the normal mode, which may suppress decrease in battery life time.

On the other hand, when the TPMSCU 4 cannot determine the correspondence between each sensor ID and each wheel position despite elapsed time of cumulative travel of eight (8) minutes, the auto-learning mode will be terminated and the process transitions to the monitoring mode. The total number of TPMS data is thirty (30) times or less when the cumulative travel time has passed eight minutes, the auto-learning mode may be terminated substantially in synchronization with the completion of the constant position transmission mode of the TPMS sensor 2.

The sensor CU2c of the TPMS sensor 2 detects the rotational position of the TPMS sensor 2 based on the gravity acceleration dependent component of the centrifugal acceleration detected by the G sensor 2b during the constant position transmission mode and transmits the TPMS data at the peak of the gravity acceleration dependent component so that the TPMS data will be transmitted at the top point at all times of transmission. Although the centrifugal acceleration exerted on the TPMS sensor 2 may be subject to change due to the acceleration/deceleration of the wheel 1, the gravity acceleration dependent component constantly draws a waveform of constant width (−1 to 1 [G]) and changes with an extremely shorter period compared to the speed of change in the centrifugal acceleration accompanied by the vehicle acceleration/deceleration. Therefore, it is easy to grasp the change in the gravity acceleration dependent component based on the centrifugal accelerations.

However, when a brake control such as an ABS control and a brake traction control is being executed, the wheel 1 under control is subject to vibrate longitudinally in an extremely short period due to that control, the centrifugal acceleration detected by the G sensor 2b will be affected and fluctuates in an extremely short period with a large width or amplitude (several tens [G] or more). Thus, the sensor CU2c might falsely determine the shake or fluctuations as the peak in the gravitational acceleration dependent component so that the likelihood exists that the TPMS data will be transmitted at a rotational position other than the peak.

Thus, the rotational position calculation unit 4a of the TPMSCU 4 calculates the rotational position of each wheel 1 at the timing at which the rotational position of each TPMS sensor 2 has reached its peak based on the timing of receipt of the TPMS data and the count value of wheel speed pulses for each wheel at that timing. Therefore, the rotational position calculation unit 4a calculates the rotational position of each wheel 1 which has been transmitted at the rotational position other than the top point as that transmitted at the top point and the dispersion calculation unit 4b is to calculate the dispersion characteristic value X for each wheel 1 by including that rotational position in the rotational position data. Consequently, due to inclusion of false rotational position data into the rotational position data for each wheel, the creation of the difference between the maximum value and the other values for each dispersion characteristic value X will be delayed and the wheel position determination will be delayed.

In contrast, in the first embodiment, the rotational position detection inhibition unit 4e inhibits the rotational position calculation unit 4a from detecting the rotational position for each wheel when a brake control such as an ABS control is being executed.

More specifically, when there is the likelihood that the transmission timing of the TPMS data is different from normal or ordinary transmission timing, by inhibiting the calculation of the rotational position of each wheel based on that TPMS data the calculation of the dispersion characteristic value X using erroneous or false data will be suppressed.

Stated another way, when there is a likelihood that the transmission timing of the TPMS data has been made at a timing different from normal or ordinary timing, then, by inhibiting the calculation of the rotational position of each wheel 1, the erroneous rotational position data will be prevented from being included in the rotational position data for each wheel. Therefore, a delay in determining the wheel position will be suppressed, and the correspondence relationship between each sensor ID and each wheel position may be determined early.

In the tire pneumatic pressure monitoring device in the first embodiment, the following effects are achieved.

In the tire pneumatic pressure monitoring device that monitors the pneumatic pressure of each tire, provided are a pressure sensor 2a that detects the pneumatic pressure of the tire and that is installed on the tire of each wheel 1; a pressure sensor 2a for detecting the pneumatic pressure of each tire; a G sensor 2b that that is installed on the tire of each wheel 1 and detects the centrifugal acceleration acting on tire, and; a transmitter 2d that is installed on each wheel 1 and detects the rotational position of the wheel based on the detected value of the G sensor 2b to transmit as a wireless signal the pneumatic pressure at the prescribed rotational position together with the sensor ID; a receiver 3 that is arranged on the side of the vehicle body and receives the wireless signal, a rotational position calculation unit 4a installed on the vehicle body side and detect the rotational position of each wheel 1 when the wireless signal including a specific sensor ID, a wheel position determination unit 4c that determines the wheel position of the transmitter corresponding to that specific sensor ID based on the rotational position of each wheel 1, and a rotational position detection inhibition unit 4e that inhibits the detection of the rotational position of each wheel 1 by the rotational position calculation unit 4a.

Thus, the delay in the wheel position determination due to the vibration of the wheel 1 caused by a brake control may be suppressed and the correspondence between each sensor ID and each wheel position may be early established.

(2) The wheel position determination unit 4c acquires the rotational position for each wheel 1 a plurality of times, accumulates the rotational position data for each wheel, and determines the wheel position corresponding to the rotational position data with least degree of dispersion among the rotational position data as the wheel position of the transmitter 3 corresponding to the specific sensor ID.

Thus, the correspondence relationship between each TPMS sensor 2 and each wheel position may be determined with accuracy.

(3) The G sensor 2b detects the centrifugal acceleration exerted on a tire while the TPMS sensor 2 detects the rotational position of the wheel based on the gravitational acceleration dependent component of the centrifugal acceleration. Thus, even at a state of vehicle acceleration/deceleration, the rotational position of the wheel may be detected in good accuracy.

While best embodiments have been described to implement the present invention, the specific configuration is not limited to these embodiments. Rather, the design change or alterations that do not depart the essence of the present invention may be included in the present invention.

For example, G sensor may detect the acceleration exerted in a rotational direction of the tire and detects the rotational position on that acceleration detected. During a constant travel of the vehicle in which no acceleration/deceleration is occurring in the rotational direction of the tire, the accelerations acting on the tire is "0" [G] either at a top or bottom of the tire while assumes "1" [G] or "−1" [G] at the front and aft direction, respectively. Therefore, by transmitting TPMS data at the timing when the detection value of the acceleration sensor assumes "1" or "−1", the TPMS data may be transmitted at a constant rotational position.

The invention claimed is:

1. A tire pneumatic pressure monitoring device comprising:
   a tire pneumatic pressure sensor installed on a tire of each wheel to detect a tire pneumatic pressure acting on the tire;
   an acceleration sensor installed on the tire of each wheel to detect an acceleration in a prescribed direction acting on the tire;
   a transmitter arranged on each wheel to detect a rotational position of the wheel based on a detected value of the acceleration sensor for transmitting the pneumatic pressure along with identification information unique to each transmitter via a wireless signal;
   a receiver installed on a vehicle body to receive the wireless signal;
   a rotational position detection unit installed on the vehicle body to detect the rotational position of each wheel when a specific identification information has been transmitted;
   a wheel position determination unit that acquires the rotational position of each wheel a plurality of times to accumulate rotational position data for each wheel and determines a wheel position corresponding to the rotational position data with a least dispersion degree among the rotational position data as a wheel position of the transmitter corresponding to the specific identification information; and
   a detection inhibition unit that inhibits the accumulation of the rotational position data of each wheel by the wheel position determination unit when a braking control to control a wheel cylinder pressure of the wheel is being executed.

2. A tire pneumatic pressure monitoring device, comprising:
   a tire pneumatic pressure sensor installed on a tire of each wheel to detect a pneumatic pressure acting on the tire;
   an acceleration sensor installed on the tire of each wheel to detect an acceleration in a prescribed direction acting on the tire;
   a transmitter arranged on each wheel to detect a rotational position of the wheel based on a detected value of the acceleration sensor for transmitting the pneumatic pressure along with identification information unique to each transmitter via a wireless signal;
   a receiver installed on a vehicle body to receive the wireless signal;
   a rotational position detection unit installed on the vehicle body to detect the rotational position of each wheel when a specific identification information has been transmitted;
   a wheel position determination unit that acquires the rotational position of each wheel a plurality of times to accumulate rotational position data for each wheel and determines a wheel position corresponding to the rotational position data with a least dispersion degree among the rotational position data as the wheel position of the transmitter corresponding to the specific identification information; and
   a detection inhibition unit that inhibits detection of the rotational position of each wheel by the rotational position detection unit when a braking control to control a wheel cylinder pressure of the wheel is being executed, wherein
   the wheel position determination unit is configured to convert the rotational position of the wheel to a vector on a two dimensional plane with its origin as a starting point and the circumferential point of a unit circle as an ending point, calculate a scalar quantity of an average vector of each rotational position data as a dispersion characteristic value and determine a maximum value of each dispersion characteristic value as that with a least dispersion degree.

3. The tire pneumatic pressure monitoring device as claimed in claim 2, wherein the braking control is an anti-skid braking control in which a wheel with a locking tendency is suppressed by adjusting the wheel cylinder pressure of the wheel.

4. The tire pneumatic pressure monitoring device as claimed in claim 2, wherein the braking control is a vehicle behavior stability control to ensure a vehicle driving stability in which the vehicle with an over-steering or under-steering tendency is suppressed by imparting a braking force.

5. The tire pneumatic pressure monitoring device as claimed in claim 2, wherein the braking control is a brake traction control operable in response to an idle rotation of a driving wheel to suppress the idle rotation of the driving wheel and increase a tire gripping force.

6. The tire pneumatic pressure monitoring device as claimed in claim 2, wherein the braking control is a brake differential limiting control to limit a differential using a brake.

* * * * *